United States Patent
Du et al.

(10) Patent No.: US 9,959,223 B2
(45) Date of Patent: May 1, 2018

(54) METHOD AND SYSTEM FOR INTERRUPT SIGNALING IN AN INTER-INTEGRATED CIRCUIT (I2C) BUS SYSTEM

(71) Applicant: NXP B.V., Eindhoven (NL)

(72) Inventors: David Alan Du, Scottsdale, AZ (US); Anubhav Gupta, Santa Clara, CA (US); Peter James Stonard, San Jose, CA (US)

(73) Assignee: NXP B.V., Eindhoven (NL)

( * ) Notice: Subject to any disclaimer, the term of this patent is extended or adjusted under 35 U.S.C. 154(b) by 491 days.

(21) Appl. No.: 14/053,823

(22) Filed: Oct. 15, 2013

(65) Prior Publication Data

US 2014/0337553 A1    Nov. 13, 2014

Related U.S. Application Data

(60) Provisional application No. 61/820,780, filed on May 8, 2013.

(51) Int. Cl.
   *G06F 13/24*    (2006.01)
(52) U.S. Cl.
   CPC .................... *G06F 13/24* (2013.01)
(58) Field of Classification Search
   CPC .................................................. G06F 13/24
   USPC ................................................. 710/260–269
   See application file for complete search history.

(56) References Cited

U.S. PATENT DOCUMENTS

| 4,402,040 | A | * | 8/1983 | Evett | G06F 13/374 710/119 |
| 4,689,740 | A | * | 8/1987 | Moelands | H04L 7/0008 710/29 |
| 5,146,567 | A | * | 9/1992 | Kao | G06F 3/023 341/22 |
| 5,210,757 | A | * | 5/1993 | Barlow | G06F 11/22 714/25 |
| 5,592,631 | A | * | 1/1997 | Kelly | G06F 13/364 710/113 |
| 7,089,338 | B1 | * | 8/2006 | Wooten | G06F 13/24 710/110 |
| 9,660,808 | B2 | * | 5/2017 | Cohen | H04L 9/3226 |
| 2005/0022064 | A1 | * | 1/2005 | Steinmetz | G06F 11/0727 714/42 |
| 2006/0227798 | A1 | | 10/2006 | Hou et al. | |
| 2006/0242348 | A1 | * | 10/2006 | Humphrey | G06F 13/4291 710/305 |

(Continued)

OTHER PUBLICATIONS

"I2C-bus specification and User manual"; Rev. 5; NXP Semiconductors; UM10204; pp. 1-64; Oct. 9, 2012.

(Continued)

*Primary Examiner* — Paul R Myers (57) ABSTRACT

Embodiments of a method and system are disclosed. One embodiment of a method for signaling an interrupt in an I2C system that includes a master I2C device and at least one slave I2C device that are connected by an SDA line and an SCL line is disclosed. The method involves, at the slave I2C device, pulling the SDA line low to signal an interrupt and at the slave I2C device, releasing the SDA line in response to either the SCL line having been pulled low or the expiration of a predetermined time period, whichever occurs first. In an embodiment, the predetermined time period is 1 ms.

14 Claims, 7 Drawing Sheets

(56) References Cited

U.S. PATENT DOCUMENTS

| | | | |
|---|---|---|---|
| 2007/0086365 A1* | 4/2007 | Chen | H04L 12/1822 370/260 |
| 2011/0113171 A1* | 5/2011 | Radhakrishnan | G06F 13/4291 710/110 |
| 2012/0144081 A1* | 6/2012 | Smith | G06F 13/24 710/269 |
| 2012/0159025 A1 | 6/2012 | Tailliet | |
| 2014/0302782 A1* | 10/2014 | Raab | H04B 5/0037 455/41.1 |

OTHER PUBLICATIONS

Maxim Integrated, "Comparing the I2CBus to the SMBus"; Application Note 476, pp. 1-5; Dec. 1, 2000.

* cited by examiner

METHOD AND SYSTEM FOR INTERRUPT SIGNALING IN AN INTER-INTEGRATED CIRCUIT (I2C) BUS SYSTEM

This application claims priority from U.S. Provisional Application Ser. No. 61/820,780, filed May 8, 2013, entitled "Interrupt Notification by Sink Notify over an Inter-Integrated (I2C) Bus," which is incorporated by reference herein.

Figure 1:
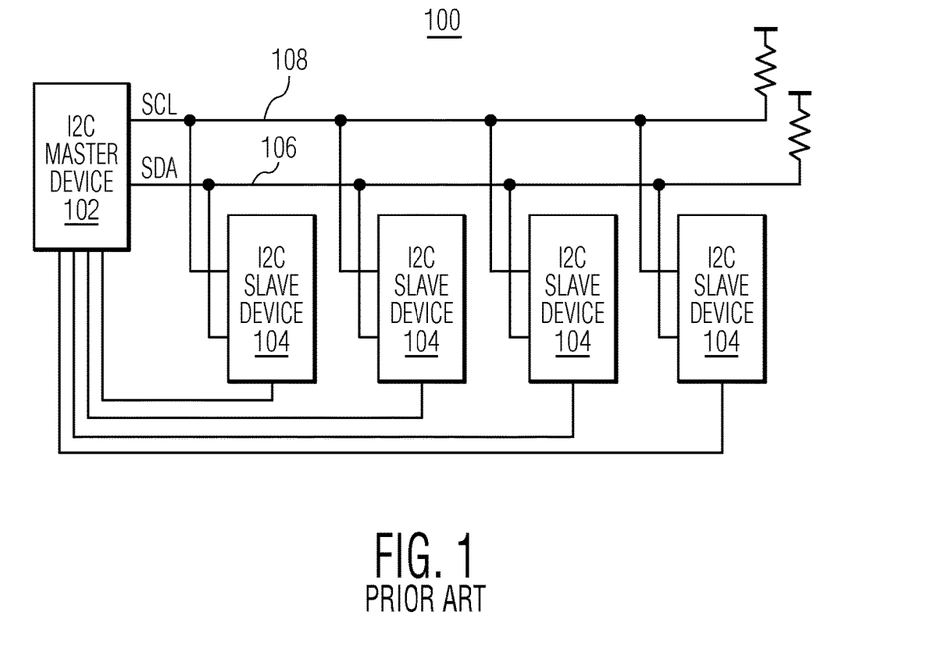
FIG. 1 depicts an I2C master device and multiple I2C slave devices connected by an SDA line and an SCL line according to the I2C specification as is known in the field.

Philips Semiconductor (now NXP Semiconductor) has developed a bidirectional two-line bus for efficient inter-IC control. This widely adopted two-line bus is known as the inter-IC or I2C bus (also referred to as "I$^2$C"). The I2C bus is described in detail in, for example, the "I$^2$C-bus specification and user manual," Rev. 5, 9 Oct. 2012 ("I2C specification"), which is incorporated by reference herein. According to the I2C specification, integrated circuits (ICs) are connected by two bus lines or "wires," a serial data (SDA) line and a serial clock (SCL) line. Both the SDA line and the SCL line are bidirectional lines, connected to a positive voltage supply, e.g., $V_{DD}$, via a current source or a pull-up resistor. Data is transmitted in I2C frames on the SDA line in 8-bit bytes, with each byte followed by an Acknowledge (ACK) bit or a Not Acknowledge (NACK) bit, and clocking information is transmitted on the SCL line. FIG. 1 depicts an I2C communications system 100 having a master I2C device 102 and multiple slave I2C devices 104 connected by an SDA line 106 and an SCL line 108 according to the I2C specification as is known in the field.

In common applications, the slave I2C devices 104 regularly need to inform the master I2C device 102 of an event through an interrupt. In conventional I2C communications systems, the slave I2C devices are connected to the master I2C device by dedicated interrupt lines to enable interrupt signaling. Therefore, the master I2C device needs a dedicated interrupt port for each supported slave I2C device and the number of interrupt ports on a master I2C device can be a limiting factor in the capacity of the master I2C device. Additionally, each interrupt port takes up valuable IC real estate. Therefore, as more and more ICs are added to electronic device, there is a need for an I2C communications system that allows slave I2C devices to signal an interrupt while conserving valuable IC real estate.

Embodiments of a method and system are disclosed. One embodiment of a method for signaling an interrupt in an I2C system that includes a master I2C device and at least one slave I2C device that are connected by an SDA line and an SCL line is disclosed. The method involves, at the slave I2C device, pulling the SDA line low to signal an interrupt and at the slave I2C device, releasing the SDA line in response to either the SCL line having been pulled low or the expiration of a predetermined time period, whichever occurs first. In an embodiment, the predetermined time period is 1 ms.

Another embodiment of a method for signaling an interrupt in an I2C system that includes a master I2C device and at least one slave I2C device that are connected by an SDA line and an SCL line is disclosed. The method involves, at the master I2C device, detecting the SDA line being pulled low by a slave I2C device to signal an interrupt, at the master I2C device, pulling the SCL line low in response to detecting the SDA line having been pulled low, and at the master I2C device, implementing an interrupt operation after the SCL line is pulled low. In an embodiment, the interrupt operation comprises transmitting an Interrupt Response Alert (IRA) message.

A device is also disclosed. The device includes an I2C module having an SDA interface for connection to an SDA line and an SCL interface for connection to an SCL line. The I2C module is configured to pull the SDA line low to signal an interrupt and release the SDA line in response to either the SCL line having been pulled low or the expiration of a predetermined time period, whichever occurs first. In an embodiment, the predetermined time period is 1 ms.

Another embodiment of a device is disclosed. The device includes an I2C module having an SDA interface for connection to an SDA line and an SCL interface for connection to an SCL line. The I2C module is configured to detect the SDA line being pulled low to signal an interrupt, to pull the SCL line low in response to detecting the SDA line having been pulled low, and to implement an interrupt operation after the SCL line is pulled low. In an embodiment, the interrupt operation comprises transmitting an IRA message.

Other aspects in accordance with the invention will become apparent from the following detailed description, taken in conjunction with the accompanying drawings, illustrated by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In accordance with an embodiment of the invention, a technique for signaling an interrupt in an I2C communications system involves using the SDA and SCL lines to signal the interrupt. In an embodiment, the technique for signaling an interrupt, referred to as bus-line interrupt signaling, involves a slave I2C device pulling the SDA line low to signal an interrupt and the master I2C device pulling the SCL line low in response to the SDA line being pulled low by the slave I2C device. Once the slave I2C device detects that the SCL line has been pulled low, the slave I2C device releases the SDA line and the master I2C device can implement an interrupt operation, such as transmitting an Interrupt Response Alert (IRA) message to determine the source of the interrupt. In an embodiment, the slave I2C device is only allowed to hold the SDA line for a predetermined time period, e.g., on the order of 1 ms, and, therefore, releases the SDA line in response to either the SCL line having been pulled low by the master I2C device or the expiration of the predetermined time period, whichever occurs first. Because an interrupt is signaled using the SCA and SCL lines, there is no need for a dedicated interrupt line. Therefore, I2C communications systems can be implemented without dedicated interrupt lines between the ICs and without dedicated interrupt ports on the ICs.

Figure 2A:
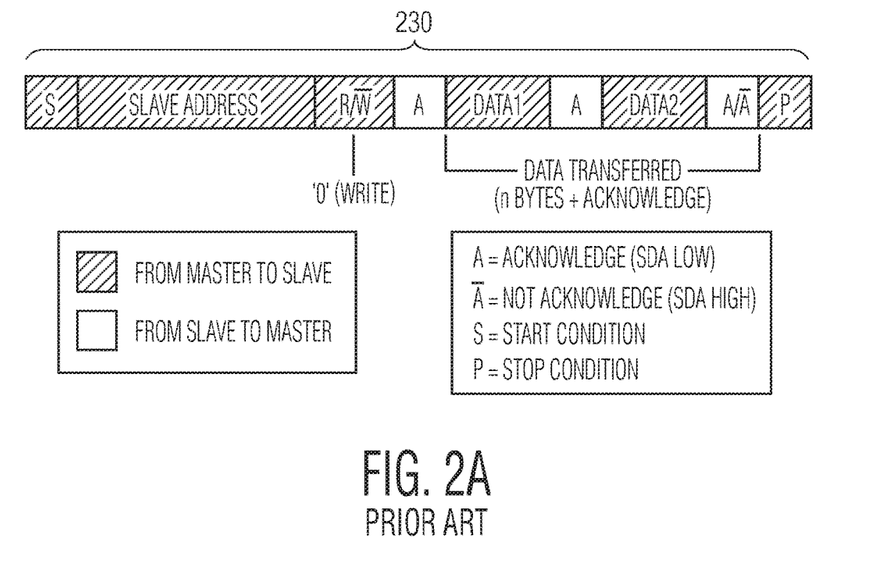
FIG. 2A depicts an I2C communications protocol for writing digital data from a master I2C device to a slave I2C device as is known in the field.
Figure 2B:
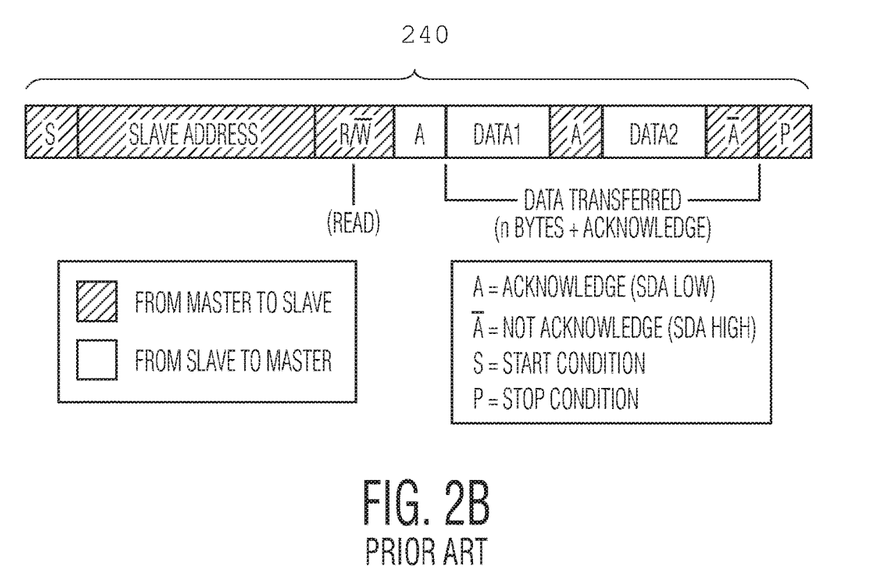
FIG. 2B depicts an I2C communications protocol for reading digital data to a master I2C device from a slave I2C device as is known in the field.

FIGS. 2A and 2B depict the format of I2C communications according to the I2C specification as is known in the field. FIG. 2A depicts I2C communications 230 for writing digital data from a master I2C device to a slave I2C device. The I2C data shown in FIG. 2A includes a START condition (S), a slave address field (7-bits), a read/write field (R/$\overline{W}$) (1-bit), an ACK field (A) (1-bit), a first data byte field (DATA1) (8-bits), an ACK field (A) (1-bit), a second data byte field (DATA2) (8-bits), an ACK/NACK field (A/$\overline{A}$) (1-bit), and a STOP condition (P). It should be noted that some portions of the communications (as indicated by the cross-hatching) are generated by the master I2C device and the other portions of the communications (as indicated by the non-cross hatching) are generated by the slave I2C device as described in the I2C specification. For example, the START condition, the slave address, the read/write field, the first data byte field, the second data byte field, and the STOP condition in FIG. 2A are generated by the master I2C device and the ACKs are generated by an I2C slave device.

FIG. 2B depicts I2C communications 240 for reading digital data from a slave I2C device to a master I2C device. The I2C data shown in FIG. 2B includes a START condition (S), a slave address field (7-bits), a read/write field (R/$\overline{W}$) (1-bit), an ACK field (A) (1-bit), a first data byte field (DATA1) (8-bits), an ACK field ($\overline{A}$) (1-bit), a second data byte field (DATA2) (8-bits), a NACK field (A) (1-bit), and a STOP condition. The read communications may include more data fields depending on the size of the data read. Again, it should be noted that some portions of the communications (as indicated by the cross-hatching) are generated by the master I2C device and the other portions of the communications (as indicated by the non-cross hatching) are generated by the slave I2C device as described in the I2C specification. For example, the START condition, the slave address, the read/write field, some ACKs, and the STOP condition in FIG. 2B are generated by the master I2C device and the first ACK and the first and second data bytes are generated by a slave I2C device.

Figure 3:
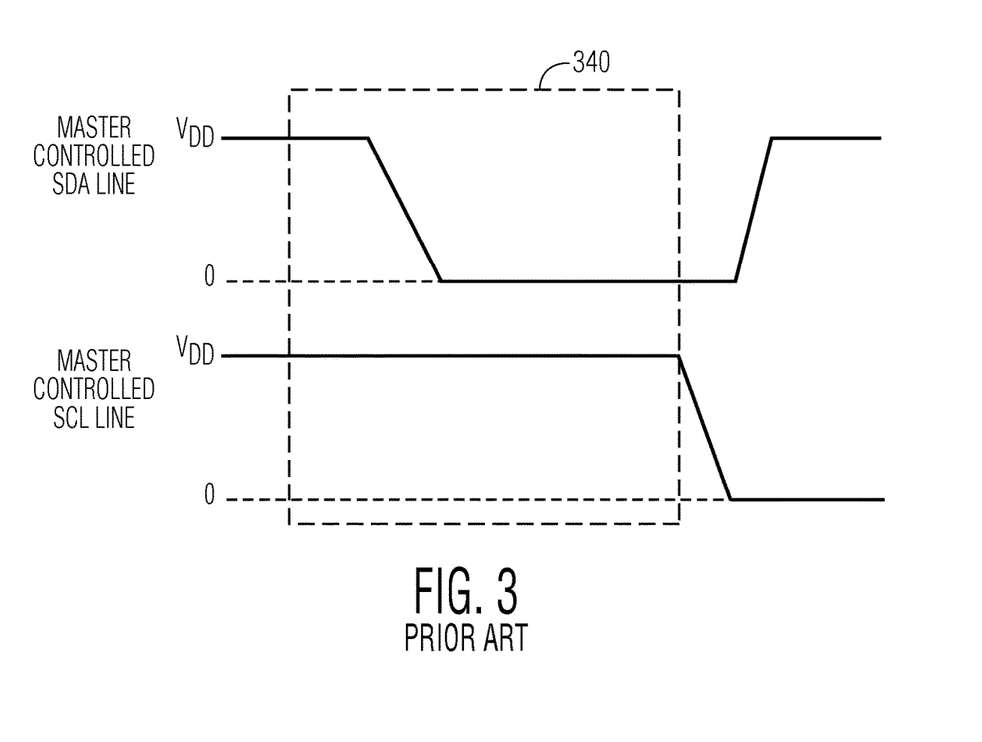
FIG. 3 depicts a voltage versus time graph of the START condition according to the I2C specification as is known in the field.

FIG. 3 depicts a voltage versus time graph of the START condition according to the I2C specification. As described in the I2C specification at Section 3.1.4, all transactions begin with a START condition and the START condition is always generated by the master I2C device. As illustrated in FIG. 3, the SDA line and the SCL line are both controlled by the master I2C device and are initially set to HIGH. When the master I2C device desires to signal a START condition 340, the master I2C device pulls the SDA line LOW. A HIGH to LOW transition on the SDA line while the SCL line is HIGH defines the START condition. As a note, due to the variety of different technology devices (e.g., CMOS, NMOS, bipolar) that can be connected to an I2C bus, the levels of HIGH (e.g., logical "1") and LOW (e.g., logical "0") are not fixed and depend on the associated level of $V_{DD}$. In the I2C specification, input reference levels are set as 30% and 70% of $V_{DD}$, e.g., $V_{IL}$ is $0.3V_{DD}$ and $V_{IH}$ is $0.7V_{DD}$.

Figure 4:
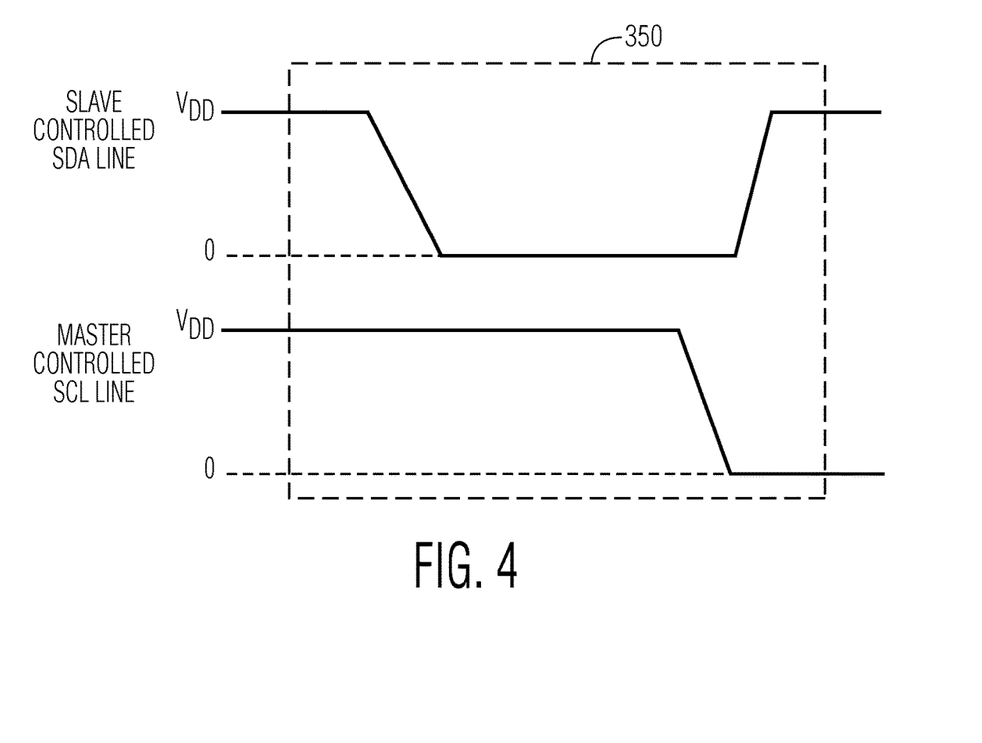
FIG. 4 depicts a voltage versus time graph of a bus-line interrupt in which the SDA line is controlled by a slave I2C device and the SCL line is controlled by the master I2C device in accordance with an embodiment of the invention.

As described in the I2C specification, START conditions are always generated by the master I2C device. In accordance with an embodiment of the invention, a signaling pattern similar to the START condition is used to signal an interrupt except that in the interrupt signaling, a slave I2C device pulls the SDA line LOW instead of the master I2C device pulling the SDA line LOW. FIG. 4 depicts a voltage versus time graph of bus-line interrupt signaling 350 in which the SDA line is controlled by a slave I2C device and the SCL line is controlled by the master I2C device. Initially, both the SDA line and the SCL line are set to HIGH and the I2C bus is idle. When the slave I2C device desires to signal an interrupt, the slave I2C device pulls the SDA line LOW. A HIGH to LOW transition on the SDA line, which was not generated by the master I2C device, while the SCL line is HIGH, indicates an interrupt to the master I2C device. In response to detecting the SDA line being pulled LOW by one of the slave I2C devices, the master I2C device pulls the SCL line LOW. Upon detecting that the SCL line has been pulled LOW, the slave I2C device releases the SDA line, e.g., allowing the SDA line to return to $V_{DD}$.

In an embodiment, the slave I2C device releases the SDA line immediately upon detecting that the SCL line has been pulled LOW. For example, the slave I2C device releases the SDA line within 0-2 μs, or preferably within 1 μs, where the time period for the SDA line to return to $V_{DD}$ is referred to as $T_{RISE}$.

Once the SDA line has been released, the master I2C device can implement an interrupt operation. For example, the master I2C device can generate and transmit an IRA message to find out which slave I2C device triggered the interrupt. In an embodiment, the master I2C device sends out an IRA message and the slave I2C device responds with its I2C address. The master I2C device then uses the I2C address of the slave I2C device to read the status of an interrupt register of the slave I2C device. In an embodiment of an IRA operation, the master I2C device sends an IRA message, which includes an address request command (e.g., 0001 1101), to the I2C bus. The slave I2C device acknowledges the IRA command and responds by returning its slave address on the SDA line. In an embodiment, the eighth bit (e.g., the LSB) of the slave address byte can be used to indicate a specific alert type that is custom to each slave. If multiple devices on the I2C bus respond to the IRA command, arbitration during the slave address portion of the IRA operation determines which slave I2C device will clear its interrupt status, for example, the slave I2C device with the lowest two-wire address wins the arbitration. In another embodiment, slave address information is communicated using a System Management Bus (SMBus) Alert Response Address (ARA) message protocol. Additionally, because the interrupt signaling is similar to the START condition (e.g., a transition of the SDA line from HIGH to LOW while the SCL line is HIGH), the other slave I2C devices on the I2C communications system interpret the signaling as a START condition and are thus ready to read communications from the master I2C device.

In an embodiment, a slave I2C device can only pull the SDA line LOW for a predetermined time period, $T_{WAIT}$, for example, for less than 1 ms. Once the predetermined time period has expired, the slave I2C device will release the SDA line even if the SCL line has not been pulled LOW by the master I2C device. Therefore, with the predetermined time period in place, the slave I2C device releases the SDA line in response to either the SCL line having been pulled low or the expiration of the predetermined time period, whichever occurs first. The slave I2C device releases the SDA line upon expiration of the predetermined time interval in order to ensure that the I2C bus is not occupied by the interrupt signaling for too long. Although a predetermined time period of 1 ms is described, the time period may be another period, such as, for example, in the range of 50 μs-10 ms. In an embodiment, the duration of $T_{WAIT}$ is a function of the throughput required by other slave I2C devices on the I2C bus. For example, if a slave I2C device requires a response to its interrupt within 100 μs, then another slave I2C device on the same I2C bus cannot hold the SDA line LOW for more than 100 μs.

Figure 5:
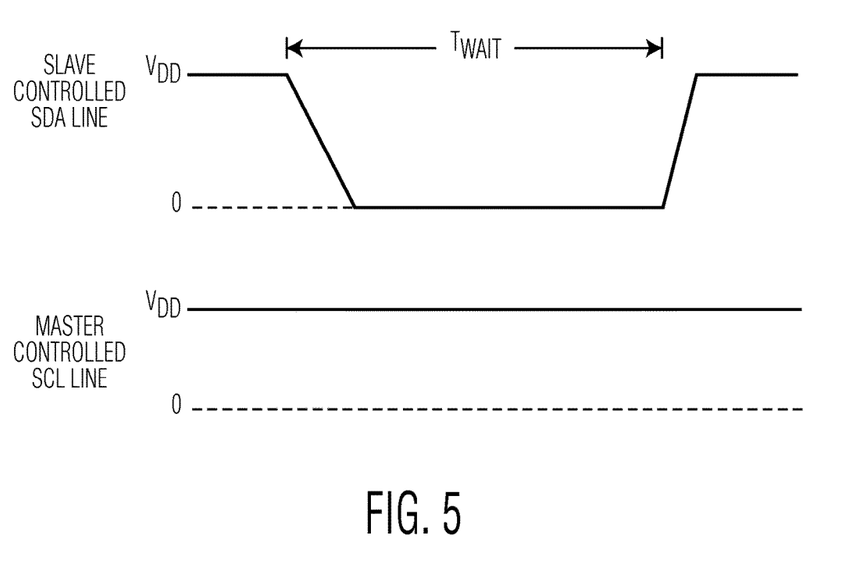
FIG. 5 depicts a voltage versus time graph of a bus-line interrupt in which the master I2C device does not pull the SCL line low and the slave I2C device releases the SDA line after a predetermined time period has expired in accordance with an embodiment of the invention.

FIG. 5 depicts a voltage versus time graph of bus-line interrupt signaling in which the master I2C device does not pull the SCL line LOW and the slave I2C device releases the SDA line after the predetermined time period ($T_{WAIT}$) has expired. Initially, both the SDA line and the SCL line are set to HIGH and the bus is idle. As illustrated in FIG. 5, when the slave I2C device desires to signal an interrupt, the slave I2C device pulls the SDA line LOW. A HIGH to LOW transition on the SDA line, which was not generated by the master I2C device, while the SCL line is HIGH, indicates an interrupt to the master I2C device. However, in some cases, the master I2C device may not recognize the interrupt signal or may chose not to acknowledge the interrupt signal. In either case, the master I2C device does not pull the SCL line LOW and the predetermined time period (e.g., 1 ms) eventually expires. Upon expiration of the predetermined time period, the slave I2C device releases the SDA line and the SDA line returns to $V_{DD}$.

Figure 6:
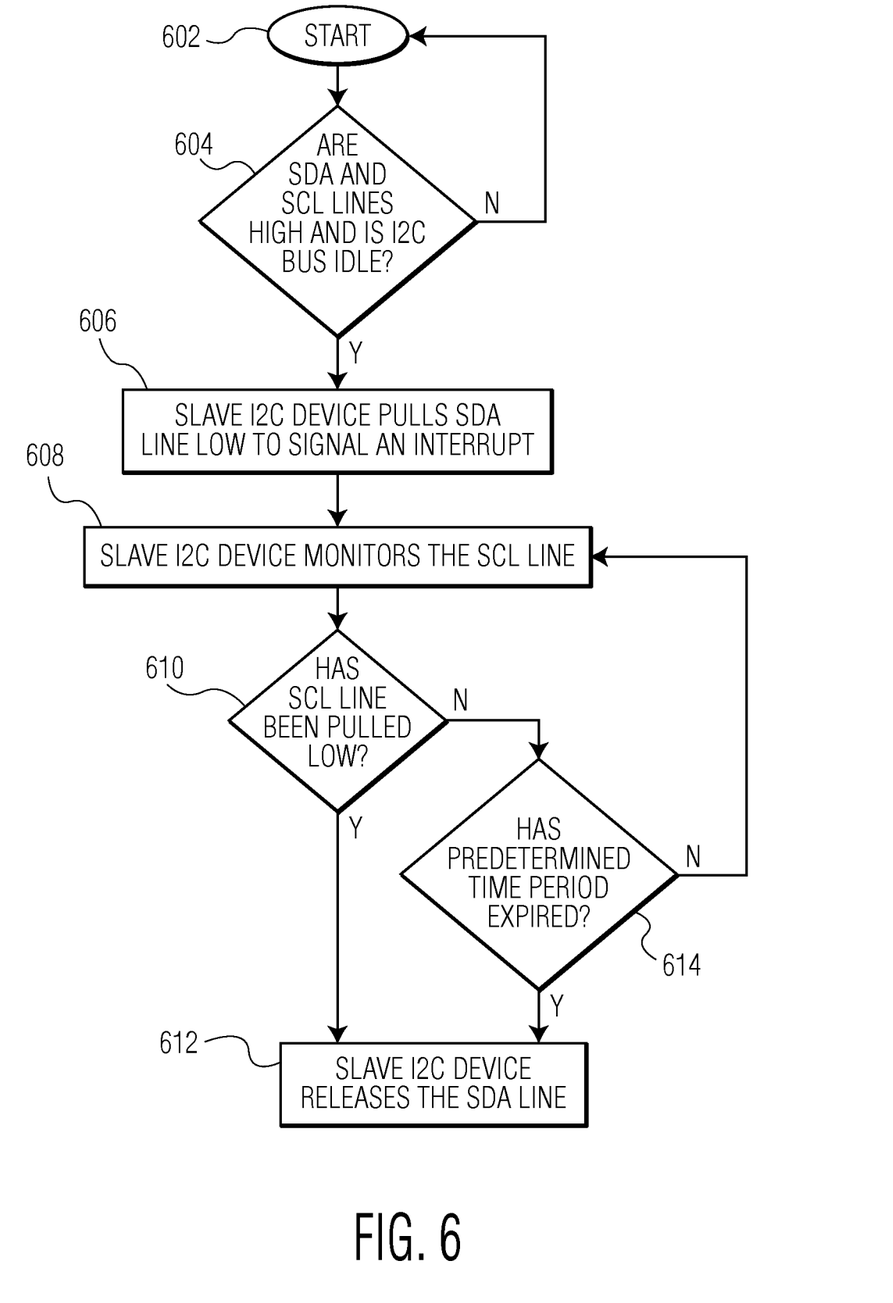
FIG. 6 is a process flow diagram of a method for bus-line interrupt signaling in an I2C communications system from the perspective of a slave I2C device in accordance with an embodiment of the invention.

FIG. 6 is a process flow diagram of a method for bus-line interrupt signaling in an I2C communications system from the perspective of a slave I2C device. The process starts at block 602 and proceeds to decision point 604. At decision point 604, it is determined if the SDA line and the SCL line are both HIGH and if the I2C bus is idle. If it is determined that either the SDA line or the SCL line is not HIGH and/or if the I2C bus is not idle, then the process returns to block 602. If, on the other hand, it is determined that both the SDA line and the SCL line are HIGH and the bus is idle, then the process proceeds to block 606. At block 606, the slave I2C device pulls the SDA line LOW to signal an interrupt. At block 608, the slave I2C device monitors the SCL line. At decision point 610, the slave I2C device determines whether the SCL line has been pulled LOW. If it is determined that the SCL line has been pulled LOW, then at block 612 the SDA line is released by the slave I2C device. If, however, the SCL line has not been pulled LOW, then the process proceeds to decision point 614, where it is determined if the predetermined time interval has expired. If the predetermined time period has not expired, then the process returns to block 608 and the slave I2C device continues to monitor the SCL line. If, on the other hand, the predetermined time interval has expired, then at block 612 the slave I2C device releases the SDA line.

Figure 7:
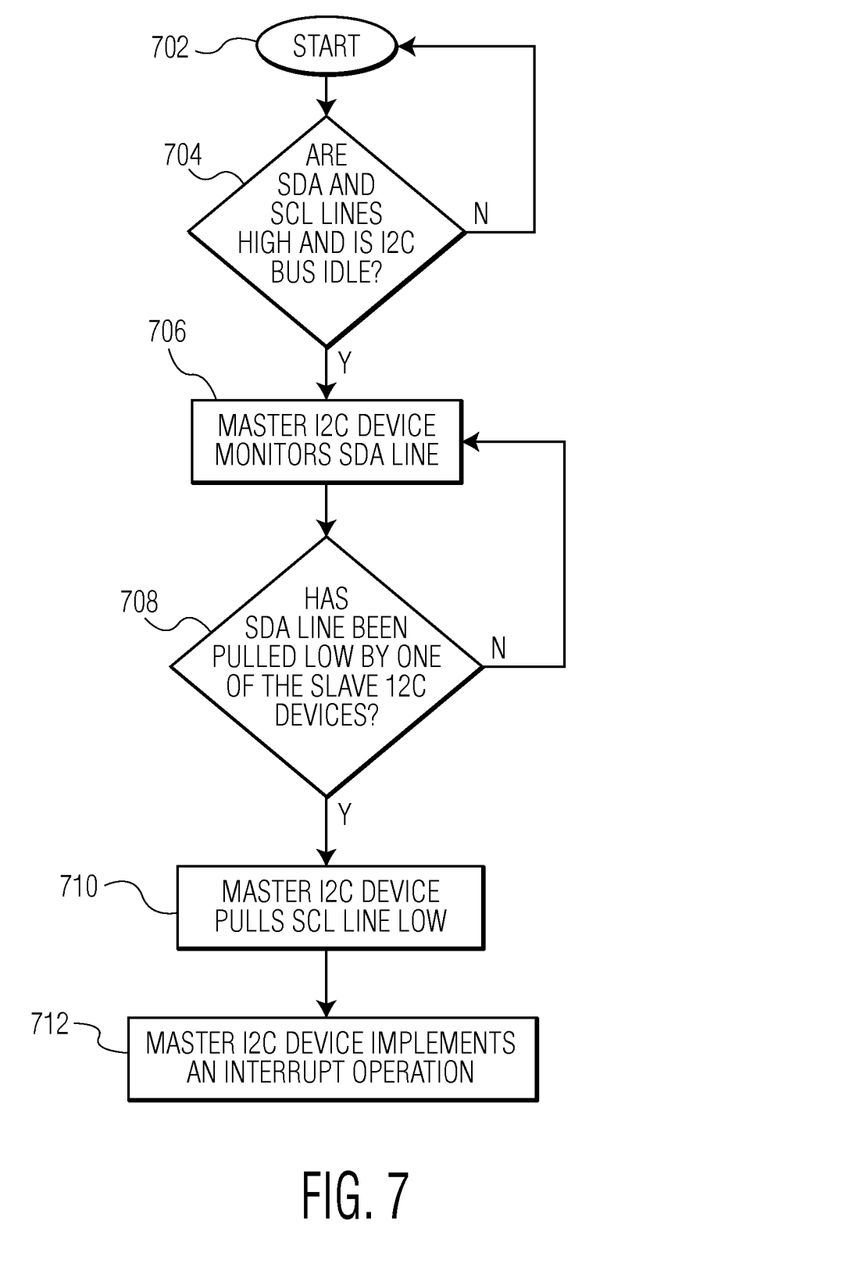
FIG. 7 is a process flow diagram of a method for bus-line interrupt signaling in an I2C communications system from the perspective of a master I2C device in accordance with an embodiment of the invention.

FIG. 7 is a process flow diagram of a method for bus-line interrupt signaling in an I2C communications system from the perspective of a master I2C device. The process starts at block 702 and proceeds to decision point 704. At decision point 704 it is determined if the SDA line and the SCL line are both HIGH and if the I2C bus is idle. If it is determined that either the SDA line or the SCL line are not HIGH and/or the I2C bus is not idle, then the process returns to block 702. If, on the other hand, it is determined that both the SDA line and the SCL line are HIGH and the bus is idle, then the process proceeds to block 706. At block 706, the master I2C device monitors the SDA line. At decision point 708, the master I2C device determines if the SDA line has been pulled LOW by one of the slave I2C devices. If the SDA line has not been pulled LOW by one of the slave I2C devices, then the process returns to block 706 and the master I2C device continues to monitor the SDA line. If, however, the master I2C device determines that the SDA line has been pulled LOW by a slave I2C device, then the process proceeds to block 710. At block 710, the master I2C device pulls the SCL line LOW and at block 712, the master I2C device implements an interrupt operation, such as transmitting an IRA message to find which slave I2C device is the source of the interrupt.

Figure 8:
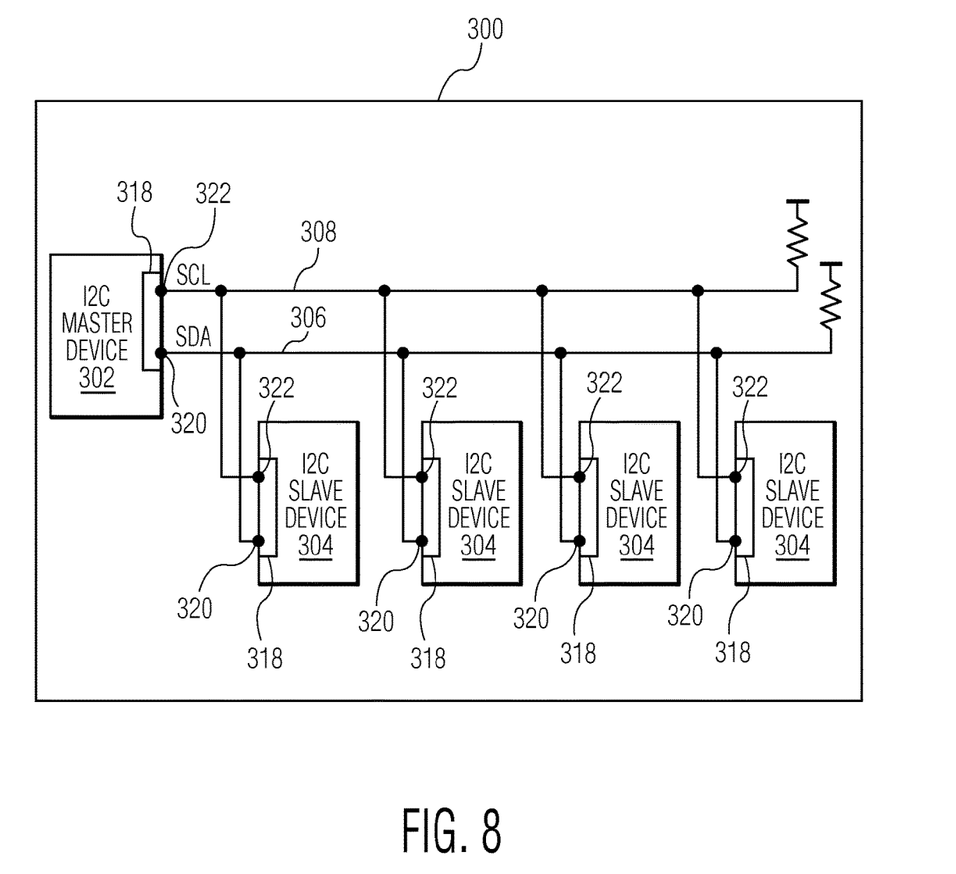
FIG. 8 depicts an embodiment of an electronic device that includes a master I2C device and multiple slave I2C devices, all of which are configured to implement bus-line interrupt signaling as described above with reference to FIGS. 4-7.

FIG. 8 depicts an embodiment of an electronic device 300 that includes a master I2C device 302 and multiple slave I2C devices 304, all of which are connected by an SDA line 306 and an SCL line 308 and configured to implement the bus-line interrupt signaling as described above with reference to FIGS. 4-7. In an embodiment, the master I2C device is an IC, such as a microcontroller, and the slave I2C devices are ICs such as A/D or D/A converters, general-purpose I/O expanders, LED controllers, DIP switches, serial EEPROMs, LCD drivers, real-time clock/calendars, and temperature sensors. Both the master I2C device and the slave I2C devices include an I2C module 318, an SDA interface 320, such as an SDA pin that can be connected to the SDA line 306, and an SCL interface 322, such as an SCL pin that can be connected to the SCL line 308. The I2C modules are configured to implement the bus-line interrupt signaling as is described above. The I2C modules may be embodied on an IC in hardware, software, and/or firmware. In an embodiment, the I2C modules of the slave I2C devices are integrated within ICs and are configured to implement operations similar those described above with reference to FIG. 6 and the I2C module of the master I2C device is integrated within an IC and is configured to implement operations similar those described above with reference to FIG. 7.

In most cases, an I2C communications network will include the master I2C device 302 and multiple slave I2C devices 304 as shown in FIG. 8. With multiple slave I2C devices connected to the same I2C bus, there is the possibility of contention between interrupt signaling between the slave I2C devices. If only one slave I2C device attempts to signal an interrupt, the process proceeds as described above. However, when two slave I2C devices attempt to use bus-line interrupt signaling at the same time to notify the master I2C device of an interrupt, the master I2C device will send out an IRA message and both slave I2C devices will respond with their corresponding slave addresses. In an embodiment, the master I2C device arbitrates between the two slaves (e.g., first and second I2C slaves) based on their slave addresses, e.g., the master selects the slave with the slave address having the lowest binary value. Other arbitration techniques are also possible. Once one of the two slave I2C devices is selected, e.g., the first slave I2C device, the other slave I2C device, e.g., the second slave I2C device, releases the I2C bus and waits for the I2C bus to become idle before attempting to use the bus-line interrupt signaling again to signal an interrupt. After the second slave I2C device successfully uses the bus-line interrupt signaling, the master I2C device will send out another IRA message and the second slave I2C device responds with its address. The master I2C device can then read the interrupt status register from both the first and second slave I2C devices to identify the interrupts.

In an embodiment, the electronic device 300 is a computer device such as a personal computer (PC), a laptop computer, a tablet or pad computer, or a smartphone. Other embodiments of the electronic device 300 are also possible. In an embodiment, the master I2C device 302 and at least some of the slave I2C devices 304 are attached to the same printed circuit board (PCB) (not shown) that is located within the electronic device.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for signaling an interrupt in an I2C system that includes a master I2C device and at least one slave I2C device that are connected by an SDA line and an SCL line, the method comprising:
   at the at least one slave I2C device, pulling the SDA line low to signal an interrupt;
   at the master I2C device, after the at least one slave I2C device pulled the SDA line low to signal the interrupt, pulling the SCL line low to complete a START and then emitting an address request command to the at least one slave I2C device; and
   at the at least one slave I2C device, responding to the address request command by sending an I2C address of the at least one slave I2C device to the master I2C device.

2. The method of claim 1, wherein the at least one slave I2C device releases the SDA line after the SCL line is not pulled low following a predetermined slave-controlled time period.

3. The method of claim 1, further comprising:
   at the master I2C device, emitting the address request command to a plurality of slave I2C devices, wherein the plurality of slave I2C devices respond to the address request command.

4. The method of claim 1, further comprising:
   at the master I2C device, detecting the SDA line being pulled low by the slave I2C device to signal the interrupt;
   at the master I2C device, pulling the SCL line low in response to detecting the SDA line having been pulled low; and
   at the master I2C device, implementing an interrupt operation after the SCL line is pulled low, wherein the interrupt operation comprises arbitrating amongst multiple slave devices that pull the SDA line low at the same time and respond to the address request command from the master I2C device, the arbitration based upon relative values of slave addresses of the multiple slave devices.

5. A method for signaling an interrupt in an I2C system that includes a master I2C device and at least one slave I2C device that are connected by an SDA line and an SCL line, the method comprising:
- at the at least one slave I2C device, pulling the SDA line low to signal the interrupt;
- at the master I2C device, after the at least one slave I2C device pulled the SDA line low to signal the interrupt, pulling the SCL line low to complete a START and then emitting an address request command to the at least one slave I2C device;
- at the at least one slave I2C device, responding to the address request command by sending an I2C address of the at least one slave I2C device to the master I2C device;
- arbitrating amongst multiple slave devices that pull the SDA line low at the same time and respond to the address request command from the master I2C device, the arbitration based upon relative values of slave addresses of the multiple slave devices.

6. The method of claim 5, wherein the at least one slave I2C device releases the SDA line after the SCL line is not pulled low following a predetermined slave-controlled time period.

7. The device of claim 5, wherein the arbitration uses I2C arbitration.

8. A device comprising:
- at least one slave I2C device having an SDA interface for connection to an SDA line and an SCL interface for connection to an SCL line, the at least one slave I2C device being configured to pull the SDA line low to signal an interrupt; and
- a master I2C device including an SDA interface for connection to the SDA line and an SCL interface for connection to the SCL line, configured to, after the at least one slave I2C device pulled the SDA line low to signal the interrupt, pull the SCL line low to complete a START and then emit an address request command to the at least one slave I2C device, and receive, in response to the address request command, an I2C address of the at least one slave I2C device.

9. The device of claim 8, wherein the at least one slave I2C device is configured to release the SDA line after the SCL line is not pulled low following a predetermined slave-controlled time period.

10. The device of claim 8, wherein the I2C module of the master I2C device is further configured to pull the SCL line low in response to detecting the SDA line having been pulled low arbitrate amongst multiple slave devices that pull the SDA line low at an identical time and respond to the IRA message, wherein the arbitration is based on relative values of slave addresses of the multiple slave devices.

11. A device comprising:
- a master I2C device having an SDA interface for connection to an SDA line and an SCL interface for connection to an SCL line, the master I2C device being configured to detect the SDA line being pulled low to signal an interrupt pull the SCL line low in response to detecting the SDA line having been pulled low, and after at least one slave I2C device of multiple slave devices pulled the SDA line low to signal the interrupt, pulling the SCL line low to complete a START and then emitting an address request command to the at least one slave I2C device, and arbitrating amongst the multiple slave devices that pull the SDA line low at the same time and respond with the IRA address request command message, the arbitration based upon relative values of slave addresses of the multiple slave devices; and
- a plurality of slave I2C devices, each slave I2C device including a SDA interface for connection to the SDA line and a SCL interface for connection to the SCL line, configured to pull the SDA line low to signal the interrupt, and respond to the address request command by sending an I2C address of the slave I2C device to the master I2C device, wherein there is arbitration among multiple slave devices of the plurality of slave I2C devices that pull the SDA line low at the same time, the arbitration based upon relative values of slave addresses of the multiple slave devices.

12. The device of claim 11, wherein the slave I2C device is configured to release the SDA line after the SCL line is not pulled low following a predetermined slave-controlled time period.

13. The method of claim 11, wherein the arbitration uses I2C arbitration.

14. The device of claim 11, wherein the master I2C device is configured to select a slave IC device of the multiple slave devices having a slave address with a lowest binary value.

* * * * *